United States Patent
Kiuchi et al.

(10) Patent No.: US 10,708,862 B2
(45) Date of Patent: Jul. 7, 2020

(54) CONTROL APPARATUS FOR CONTROLLING PLURAL PROCESS EXECUTING APPARATUSES

(71) Applicant: CASIO COMPUTER CO., LTD., Shibuya-ku, Tokyo (JP)

(72) Inventors: Toshihiro Kiuchi, Hachioji (JP); Muneyuki Ishihara, Chofu (JP); Tsuyoshi Horiguchi, Ome (JP); Hiroshi Suzuki, Akiruno (JP); Ken Fujita, Mitaka (JP); Takehito Morimatsu, Fussa (JP); Tomohiko Murakami, Musashino (JP); Naoya Okamoto, Fussa (JP); Takuya Koiso, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 181 days.

(21) Appl. No.: 15/634,664

(22) Filed: Jun. 27, 2017

(65) Prior Publication Data

US 2018/0063793 A1    Mar. 1, 2018

(30) Foreign Application Priority Data

Aug. 31, 2016  (JP) ................ 2016-168825

(51) Int. Cl.
| | | |
|---|---|---|
| *H04W 52/02* | (2009.01) | |
| *H04N 5/232* | (2006.01) | |
| *H04N 7/18* | (2006.01) | |

(52) U.S. Cl.
CPC .... *H04W 52/0235* (2013.01); *H04N 5/23203* (2013.01); *H04N 5/23241* (2013.01);
(Continued)

(58) Field of Classification Search
CPC ......... H04W 52/0235; H04W 52/0274; H04N 5/23203; H04N 5/23241; H04N 7/181
See application file for complete search history.

(56) References Cited

U.S. PATENT DOCUMENTS 9,240,854 B2    1/2016  Mukai et al.
2006/0153114 A1  7/2006  Tanaka et al.
(Continued)

FOREIGN PATENT DOCUMENTS

| CN | 102907047 A | 1/2013 |
|---|---|---|
| JP | 07193741 A | 7/1995 |

(Continued)

OTHER PUBLICATIONS

Japanese Office Action (and English language translation thereof) dated Jul. 17, 2018 issued in counterpart Japanese Application No. 2016-168825.

(Continued)

*Primary Examiner* — Dady Chery
(74) *Attorney, Agent, or Firm* — Holtz, Holtz & Volek PC (57) ABSTRACT

A control apparatus to control a plurality of process executing apparatuses, the control apparatus including: a communication unit; and a processor. The processor transmits a request to execute predetermined processing common to the process executing apparatuses, a request to change to an energy saving mode, and a request to change to a normal mode, to each of the process executing apparatuses via the communication unit, and performs control of transmission of the request to execute the predetermined processing, the request to change to the energy saving mode, and the request to change to the normal mode, such that one of the process executing apparatuses executes the predetermined processing while a rest of the process executing apparatuses is in the energy saving mode, and such that all the process executing (Continued)

apparatuses execute the predetermined processing in sequence.

17 Claims, 3 Drawing Sheets

(52) U.S. Cl.
CPC ........ *H04N 7/181* (2013.01); *H04W 52/0274* (2013.01); *H04N 5/23245* (2013.01); *Y02D 70/00* (2018.01); *Y02D 70/142* (2018.01); *Y02D 70/144* (2018.01)

(56) References Cited

U.S. PATENT DOCUMENTS

| | | | |
|---|---|---|---|
| 2014/0118778 A1* | 5/2014 | Lee | H04N 1/00127 358/1.15 |
| 2014/0193150 A1 | 7/2014 | Mukai et al. | |
| 2016/0227097 A1* | 8/2016 | Tanaka | H04N 5/23206 |
| 2017/0054839 A1* | 2/2017 | Ishikawa | H04W 52/0274 |
| 2018/0054536 A1* | 2/2018 | Kadota | H04W 4/80 |
| 2018/0063784 A1* | 3/2018 | Abraham | H04W 52/0216 |

FOREIGN PATENT DOCUMENTS

| | | |
|---|---|---|
| JP | 2002342465 A | 11/2002 |
| JP | 2006217356 A | 8/2006 |
| JP | 2014022843 A | 2/2014 |

OTHER PUBLICATIONS

Chinese Office Action dated Sep. 18, 2019 (and English translation thereof) issued in Chinese Application No. 201710583699.2.

* cited by examiner

FIG.3

CONTROL APPARATUS FOR CONTROLLING PLURAL PROCESS EXECUTING APPARATUSES

CROSS-REFERENCE TO RELATED APPLICATIONS

The present U.S. patent application claims a priority under the Paris Convention of Japanese Patent Application No. 2016-168825 filed on Aug. 31, 2016, the entirety of which is incorporated herein by references.

BACKGROUND OF THE INVENTION

Field of the Invention

The present invention relates to a control apparatus, a process executing apparatus, a control method, a process executing method, and a control system.

Description of the Related Art

There has heretofore been a technique where an imaging apparatus captures images and automatically transfers the images to external devices/apparatuses (for example, refer to Japanese Patent Application Laid-Open Publication No. 2002-342465).

SUMMARY OF THE INVENTION

According to a first aspect of the present invention, there is provided a control apparatus to control a plurality of process executing apparatuses, the control apparatus including: a communication unit; and a processor which transmits a request to execute predetermined processing common to the process executing apparatuses, a request to change to an energy saving mode, and a request to change to a normal mode, to each of the process executing apparatuses via the communication unit, and which performs control of transmission of the request to execute the predetermined processing, the request to change to the energy saving mode, and the request to change to the normal mode, such that one of the process executing apparatuses executes the predetermined processing while a rest of the process executing apparatuses is in the energy saving mode, and such that all the process executing apparatuses execute the predetermined process in sequence.

According to a second aspect of the present invention, there is provided a process executing apparatus controlled by a control apparatus, the process executing apparatus including: a communication unit; and a processor which executes predetermined processing in response to reception of a request to execute the predetermined processing from the control apparatus via the communication unit, and in response to completion of the predetermined processing, which transmits a request to change to a normal mode to the control apparatus having transmitted the request to execute the predetermined processing and changed to an energy saving mode, via the communication unit.

According to a third aspect of the present invention, there is provided a control method executed in a control apparatus which controls a plurality of process executing apparatuses, the method including: performing execution request processing to request each of the process executing apparatuses to execute predetermined processing common to the process executing apparatuses; performing energy saving request processing to request each of the process executing apparatuses to change to an energy saving mode or a normal mode; and performing control processing to control the execution request processing and the energy saving request processing such that one of the process executing apparatuses executes the predetermined processing while a rest of the process executing apparatuses is in the energy saving mode and such that all the process executing apparatuses execute the predetermined processing in sequence.

According to a fourth aspect of the present invention, there is provided a process executing method executed in a process executing apparatus controlled by a control apparatus, the method including: performing execution processing to execute predetermined processing in response to reception of a request to execute the predetermined processing from the control apparatus; and performing request processing to request the control apparatus having output the request to execute the predetermined processing and changed to an energy saving mode to change to a normal mode in response to completion of the predetermined processing in the execution processing.

According to a fifth aspect of the present invention, there is provided a control system to control a plurality of process executing apparatuses with a control apparatus, the system including: the control apparatus; and the process executing apparatuses, wherein the control apparatus includes: a first communication unit; and a first processor which transmits a request to execute predetermined processing common to the process executing apparatuses, a request to change to an energy saving mode, and a request to change to a normal mode, to each of the process executing apparatuses via the first communication unit, and which performs control of transmission of the request to execute the predetermined processing, the request to change to the energy saving mode, and the request to change to the normal mode, such, that one of the process executing apparatuses executes the predetermined processing while a rest of the process executing apparatuses is in the energy saving mode, and such that all the process executing apparatuses execute the predetermined processing in sequence, and each of the process executing apparatuses includes: a second communication unit; and a second processor which executes the predetermined processing in response to reception of the request to execute the predetermined processing from the control apparatus via the second communication unit, and in response to completion of the predetermined processing, which transmits a request to change to an normal mode to the control apparatus having transmitted the request to execute the predetermined processing and changed to an energy saving mode, via the second communication unit.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE SEVERAL VIEWS OF THE DRAWINGS

The following description with reference to the accompanying drawings can contribute to better understanding of the invention.

DETAILED DESCRIPTION OF THE PREFERRED EMBODIMENTS

Specific embodiments of the invention will now be described with reference to the drawings. The illustrated examples should not be construed to limit the scope of the invention.

Figure 1:
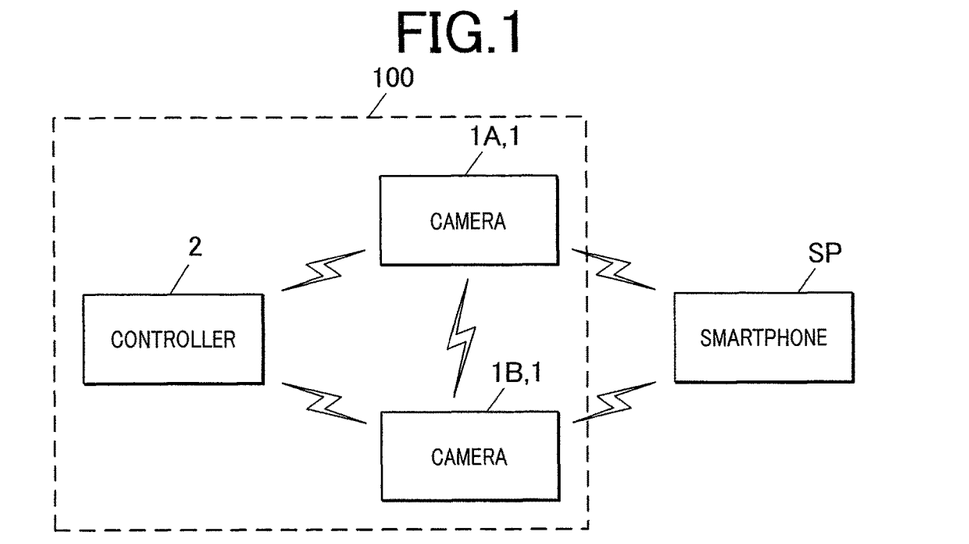
FIG. 1 illustrates a schematic configuration of a multiple-connection camera system according to an embodiment of the invention.

FIG. 1 illustrates a schematic configuration of a multiple-connection camera system 100 (a control system) according to an embodiment of the invention.

With reference to FIG. 1, the multiple-connection camera system 100 according to the embodiment includes a plurality of cameras 1 (two cameras 1A and 1B in FIG. 1; process executing apparatuses) and a controller 2 (a control apparatus) which perform radio communication utilizing synchronous communication scheme (e.g., Bluetooth (registered trademark)) with each other.

The multiple-connection camera system 100 has a function to automatically transfer images (static and dynamic images) captured at the cameras 1 to a smartphone SP as the external device/apparatus at a timing of change of the controller 2 to a sleep mode (energy saving mode).

The controller 2 will now be described with reference to FIG. 2.

Figure 2:
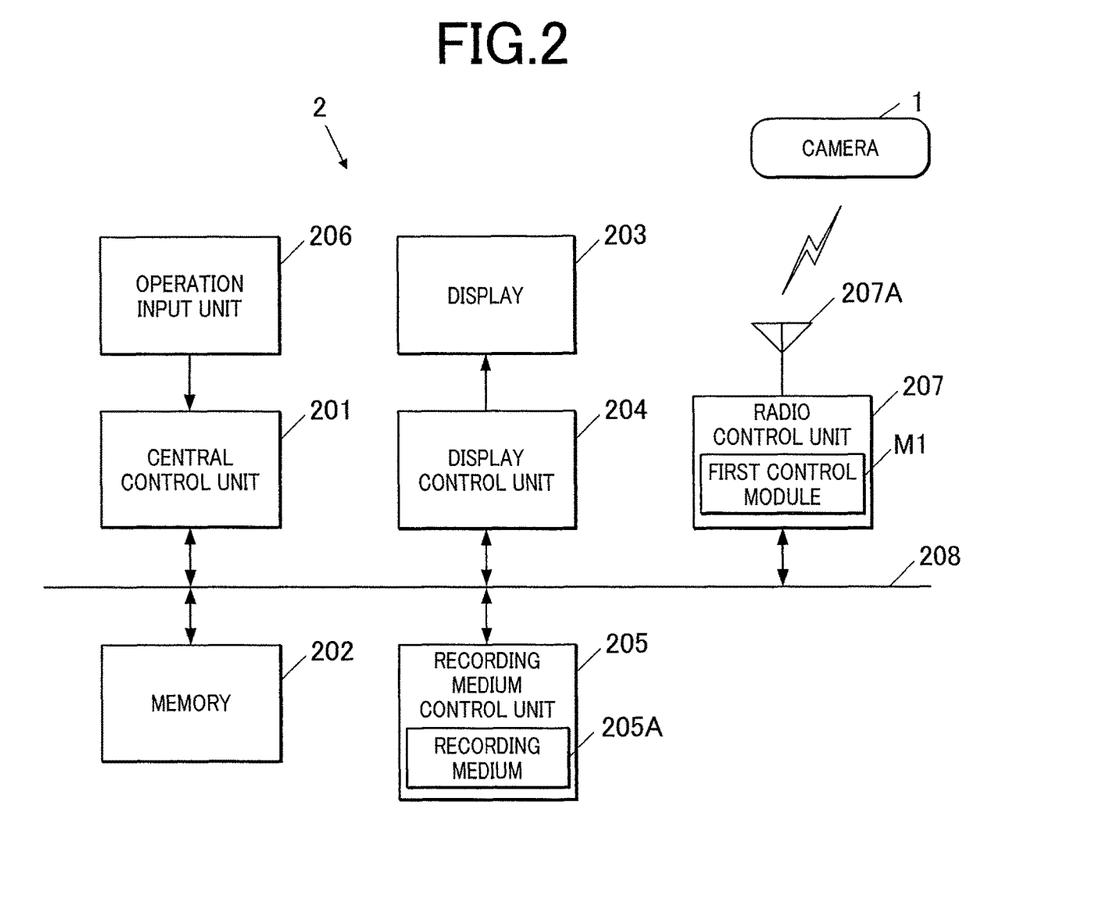
FIG. 2 is a block diagram illustrating a schematic configuration of a controller included in the multiple-connection camera system in FIG. 1.

FIG. 2 is a block diagram illustrating a schematic configuration of the controller 2.

The controller 2 functions as a master in the radio communication utilizing synchronous communication scheme with the device/apparatuses (e.g., the cameras 1) to be controlled. In detail, with reference to FIG. 2, the controller 2 includes a central control unit 201, a memory 202, a display 203, a display control unit 204, a recording medium control unit 205, an operation input unit 206, and a radio control unit 207.

The central control unit 201, the memory 202, the display control unit 204, the recording medium control unit 205, and the radio control unit 207 are connected to each other with a bus line 208.

The controller 2 may be any dedicated apparatus compatible with the cameras 1, cellphone, smartphone, or personal digital assistant (PDA), for example.

The central control unit 201 (functioning as a process execution requesting member, energy saving requesting member, control member, energy saving member, and shooting requesting member) controls the individual parts of the controller 2. In detail, the central control unit 201 includes a micro controller unit (MCU) and a digital signal processor (DSP) (which are not shown). The central control unit 201 executes various control operations under the instructions of various processing programs (not shown) for the controller 2.

The memory 202 includes a dynamic random access memory (DRAM), for example. The memory 202 temporarily stores the data processed by the individual parts, such as the central control unit 201, of the controller 2.

The display 203 includes an LCD, for example. The display 203 displays various information items in a display region thereof under the control of the central control unit 201. In detail, the display 203 displays an application screen (e.g., a live view image display screen or a remote control screen) based on the image signals transmitted from the display control unit 204 in the display region, for example.

The display control unit 204 generates the application screen on the basis of the execution of various application programs (e.g., a live view image displaying program or a remote control program; which are not shown) by the central control unit 201, and outputs image signals based on the generated application screen to the display 203.

The recording medium control unit 205 is configured such that a recording medium 205A is attachable/detachable to/from the recording medium control unit 205. The recording medium control unit 205 controls the reading and writing of data from and into the recording medium 205A installed in therein.

In detail, the recording medium control unit 205 causes the recording medium 205A to store image data on the static and dynamic images captured at a camera 1 and transmitted from the camera 1 via wireless communication, for example, into a predetermined storage area of the recording medium 205A.

The recording medium 205A is a non-volatile memory (flash memory), for example.

The operation input unit 206 transmits various instructions to the controller 2.

In detail, the operation input unit 206 is equipped with, for example, a power button for turning on or off the controller 2; and four cursor buttons (up, down, right, and left buttons) and an enter button for selecting modes and functions (these buttons are not shown).

In response to the operation of any of these buttons by a user, the operation input unit 206 transmits an operational instruction corresponding to the operated button to the central control unit 201. Under the operational instruction from the operation input unit 206, the central control unit 201 instructs the individual parts to execute a certain operation (e.g., an operation for synchronous communication).

The operation input unit 206 may include a touch panel integrated with the display 203. In this configuration, the operation input unit 206 transmits an operational instruction corresponding to a certain operation of the touch panel by the user, to the central control unit 201.

The radio control unit 207 controls the communication with the devices/apparatuses (e.g., the cameras 1) to be controlled that are connected to the controller 2 with predetermined wireless links.

In other words, the radio control unit 207 is capable of data transmission and reception via the radio communication utilizing synchronous communication scheme (e.g., Bluetooth). For example, the radio control unit 207 includes a first control module M1 for performing the radio communication with synchronous communication scheme in the Bluetooth standard with the devices/apparatuses to be controlled via a communication antenna 207A.

The camera 1 will now be described with reference to FIG. 3.

Figure 3:
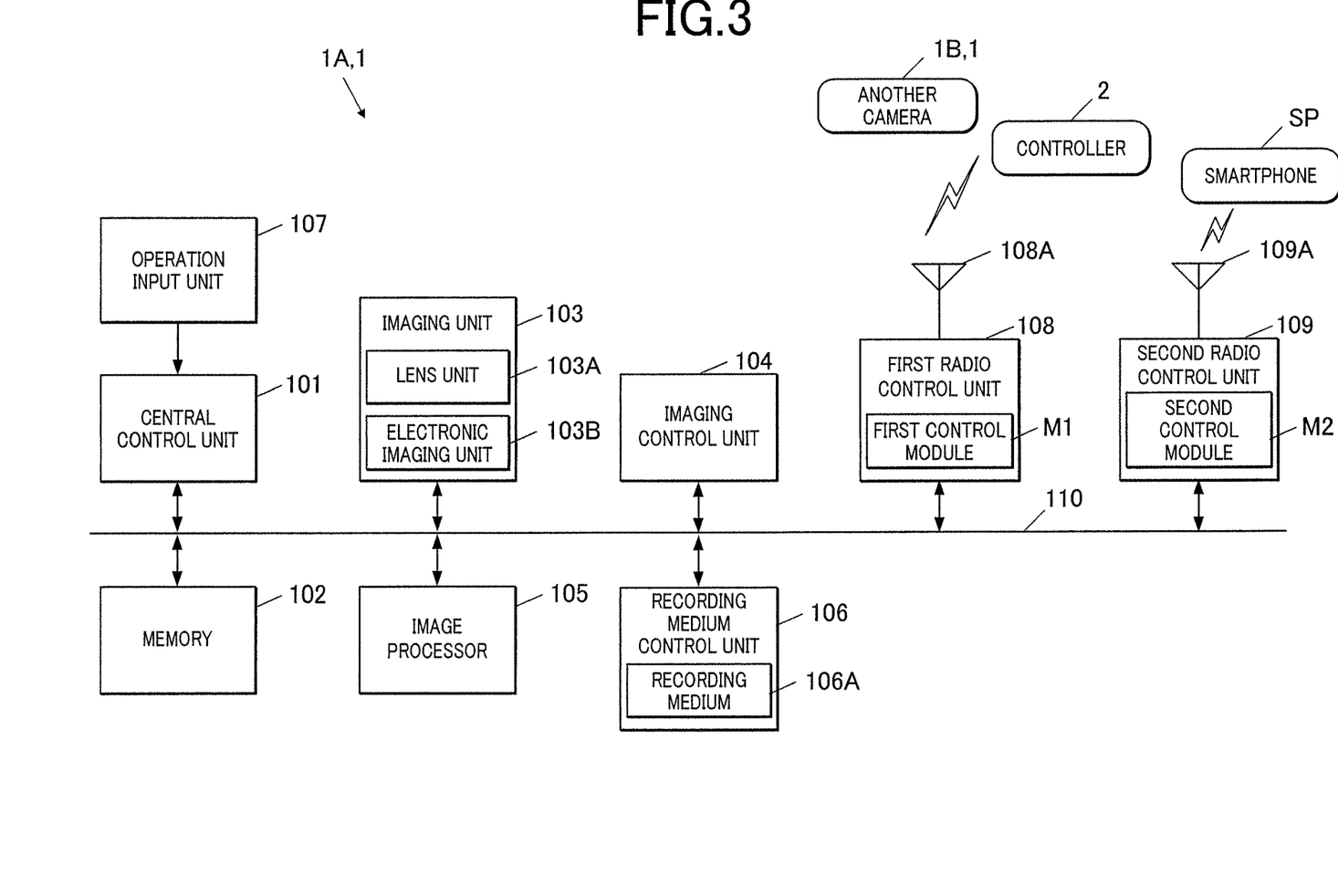
FIG. 3 is a block diagram illustrating a schematic configuration of a camera included in the multiple-connection camera system in FIG. 1.

FIG. 3 is a block diagram illustrating a schematic configuration of the cameras 1.

Plural cameras 1 function as slaves in the radio communication utilizing synchronous communication scheme with a controlling device/apparatus (the controller 2). These cameras 1 have substantially identical configurations and operations; hence, a camera 1A will be described below as a representative example. The cameras 1 are not necessarily of the identical model.

With reference to FIG. 3, the camera 1A includes a central control unit 101, a memory 102, an imaging unit 103, an imaging control unit 104, an image processor 105, a recording medium control unit 106, an operation input unit 107, a first radio control unit 108, and a second radio control unit 109.

The central control unit 101, the memory 102, the imaging unit 103, the imaging control unit 104, the image processor 105, the recording medium control unit 106, the first radio control unit 108, and the second radio control unit 109 are connected to each other with a bus line 110.

The central control unit 101 (functioning as an execution member, request member, and energy saving member) controls the individual parts of the camera 1A. In detail, the central control unit 101 includes a micro controller unit (MCU) and a digital signal processor (DSP) (which are not shown). The central control unit 101 executes various control operations under the instructions of various processing programs (not shown) for the camera 1A.

The memory 102 includes a dynamic random access memory (DRAM), for example. The memory 102 temporarily stores the data processed by the individual parts, such as the central control unit 101, of the camera 1A.

The imaging unit 103 constitutes an imaging member which captures images of a subject. In detail, the imaging unit 103 includes a lens unit 103A and an electronic imaging unit 103B.

The lens unit 103A includes a plurality of lenses, such as a zoom lens and a focusing lens.

The electronic imaging unit 103B includes an image sensor, such as a charge coupled device (CCD) or a complementary metal-oxide semiconductor (CMOS). The electronic imaging unit 103B converts an optical image passing through the lenses of the lens unit 103A into two-dimensional image signals.

The imaging unit 103 may further include a diaphragm (not shown) for adjusting the amount of light passing through the lens unit 103A.

The imaging control unit 104 controls the capture of images of the subject by the imaging unit 103. In detail, the imaging control unit 104 includes a timing generator and a driver (which are not shown). The imaging control unit 104 performs scan driving of the electronic imaging unit 103B with the timing generator and the driver, to convert an optical image formed at the lens unit 103A into two-dimensional image signals by the electronic imaging unit 103B at predetermined intervals. The imaging control unit 104 then reads frame images for every screen from the imaging region of the electronic imaging unit 103B and outputs the frame images to the image processor 105.

According to the embodiment, the imaging control unit 104 receives the shooting request from the central control unit 201 (the shooting requesting member) of the controller 2, and controls the capture of images of the subject by the imaging unit 103 based on the shooting request.

The image processor 105 generates image data on the captured images of the subject.

In detail, the image processor 105 appropriately adjusts the gain of the analog signals representing the frame images transmitted from the electronic imaging unit 103B for each of the RGB colors. These analog signals are sampled and held at a sample-and-hold circuit (not shown), converted into digital data at an A/D converter (not shown), and subjected to a color processing operation involving pixel interpolation and y correction at a color processing circuit (not shown). This operation yields digital luminance signals Y and color difference signals Cb and Cr (YUV data).

For the controller 2 displaying a live view image, the image processor 105 generates image data for displaying the individual frame images of the live view image, and outputs the image data to the first radio control unit 108. The first radio control unit 108 transmits the input image data to the controller 2 via a communication antenna 108A.

In order to record the images, the image processor 105 compresses the YUV data on the subject in accordance with a predetermined coding format (e.g., the JPEG, Motion JPEG, or MPEG format), and outputs the compressed data to the recording medium control unit 106.

The recording medium control unit 106 is configured such that a recording medium 106A is attachable/detachable to/from the recording medium control unit 106. The recording medium control unit 106 controls the reading and writing of data from and into the recording medium 106A installed in the recording medium control unit 106.

In detail, the recording medium control unit 106 causes the recording medium 106A to store the image data encoded in the predetermined compression format (e.g., the JPEG, Motion JPEG, or MPEG format) by the image processor 105, into a predetermined storage area of the recording medium 106A.

The recording medium 106A is a non-volatile memory (flash memory), for example.

The operation input unit 107 allows the user to operate the camera 1A.

In detail, the operation input unit 107 is equipped with, for example, a power button for turning on or off the camera 1A; a shutter button for instructing the capture of an image of the subject; and select and enter buttons for selecting imaging modes and functions (these buttons are not shown).

In response to the operation of any of these buttons by the user, the operation input unit 107 transmits an operational instruction corresponding to the operated button to the central control unit 101. Under the operational instruction from the operation input unit 107, the central control unit 101 instructs the individual parts to execute a certain operation.

The first radio control unit 108 controls the communication with the other devices/apparatuses (e.g., the other cameras 1 and the controller 2) constituting the multiple-connection camera system 100 and connected to the camera 1A with predetermined wireless links.

In detail, the first radio control unit 108 has a substantially identical configuration to that of the radio control unit 207 of the controller 2. The first radio control unit 108 transmits and receives data via the radio communication utilizing synchronous communication scheme (e.g., Bluetooth). For example, the first radio control unit 108 includes a first control module M1 for performing the radio communication utilizing synchronous communication scheme in the Bluetooth standard with the other cameras 1 and the controller 2 via the communication antenna 108A.

The second radio control unit 109 controls the communication with external devices/apparatuses (e.g., the smartphone SP) connected to the camera 1A with predetermined wireless links.

In detail, the second radio control unit 109 transmits and receives data via the radio communication utilizing synchronous communication scheme (e.g., Bluetooth Low Energy (BLE) or wireless fidelity (Wi-Fi)). For example, the second radio control unit 109 includes a second control module M2 for performing the radio communication utilizing synchronous communication scheme in the BLE and Wi-Fi standards with the smartphone SP via a communication antenna 109A.

Figure 4:
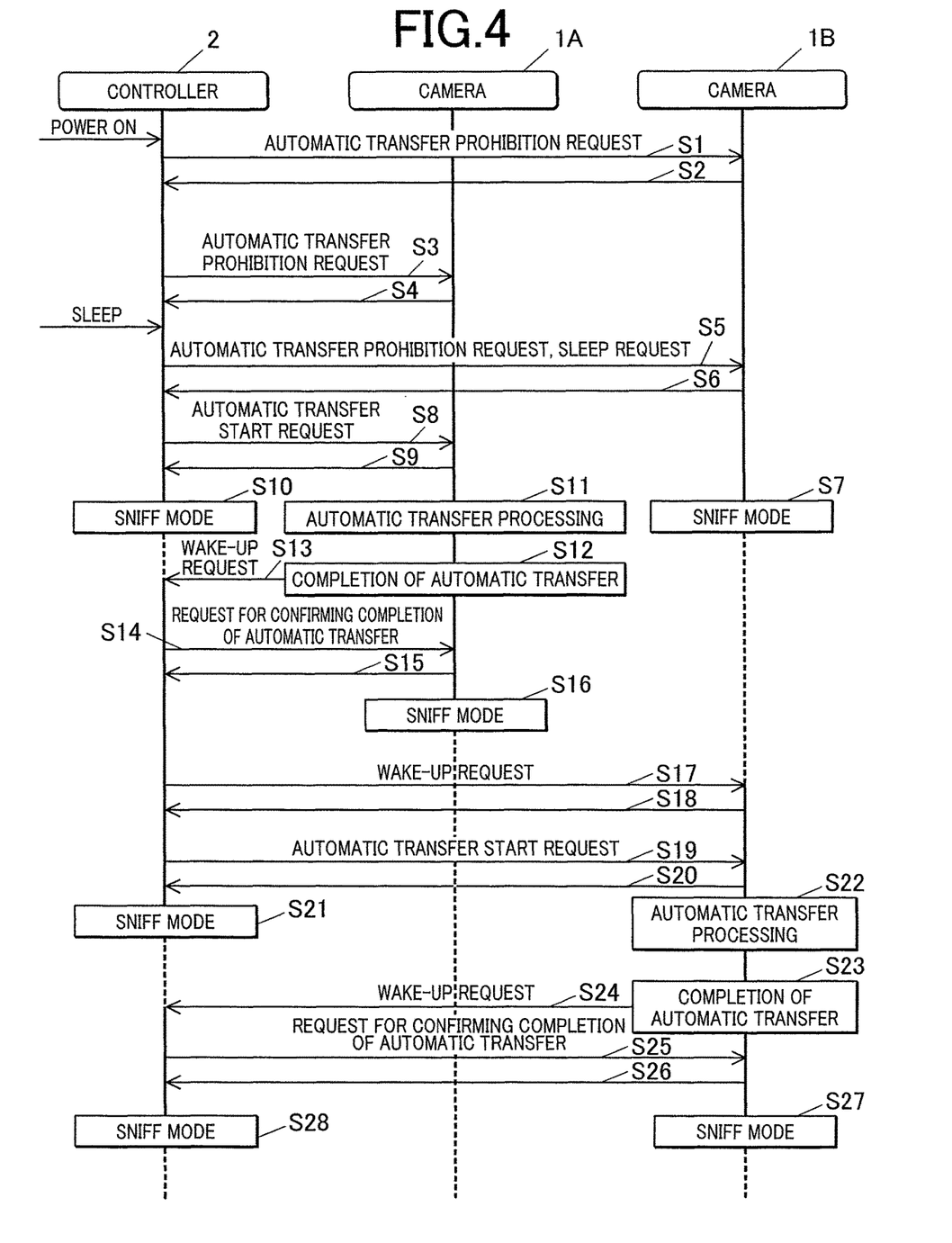
FIG. 4 is a sequence diagram illustrating example operations of automatic transfer processing executed in the multiple-connection camera system in FIG. 1.

The automatic transfer processing executed in the multiple-connection camera system 100 will now be explained according to an embodiment. FIG. 4 is a sequence diagram illustrating example operations of the automatic transfer processing.

In the automatic transfer processing explained below, the controller 2 and the cameras 1A and 1B are connected to each other via predetermined wireless links (e.g., Bluetooth links) all the time so as to transmit and receive requests to and from each other, regardless of their sleep modes (e.g., the sniff modes in the Bluetooth system). The smartphone SP (external device/apparatus; refer to FIG. 1) is connected to each of the cameras 1A and 1B via predetermined wireless links (e.g., BLE links) all the time.

With reference to FIG. 4, if a user operates the power button (not shown) of the controller 2 to turn on the controller 2, the central control unit 201 of the controller 2 transmits an automatic transfer prohibition request to the camera 1B via the radio control unit 207 (Step S1). Upon reception of the automatic transfer prohibition request, the central control unit 101 of the camera 1B transmits an acknowledgement of the automatic transfer prohibition request to the controller 2 via the first radio control unit 108 (Step S2). The controller 2 can thus prevent the camera 1B from automatically transmitting image data to the smartphone SP.

The central control unit 201 of the controller 2 then transmits an automatic transfer prohibition request to the camera 1A via the radio control unit 207 (Step S3). Upon reception of the automatic transfer prohibition request, the central control unit 101 of the camera 1A transmits an acknowledgement of the automatic transfer prohibition request to the controller 2 via the first radio control unit 108 (Step S4). The controller 2 can thus prevent the camera 1A from automatically transmitting image data to the smartphone SP.

Alternatively, the execution of Step S1 by the central control unit 201 of the controller 2 and Step S2 by the central control unit 101 of the camera 1B may be performed after the execution of Step S3 by the central control unit 201 of the controller 2 and Step S4 by the central control unit 101 of the camera 1A.

In response to a predetermined operation of the user to change the mode of the controller 2 to the sleep mode, or after the elapse of a predetermined time or more from the last operation determined with the auto power-off function of the controller 2, the controller 2 starts to prepare for the change to the sleep mode. The central control unit 201 of the controller 2 retransmits an automatic transfer prohibition request to the camera 1B for fail-safe purposes and transmits a sleep request via the radio control unit 207 (Step S5). When receiving the automatic transfer prohibition request and the sleep request, the central control unit 101 of the camera 1B transmits an acknowledgement of the automatic transfer prohibition request and an acknowledgement of the sleep request to the controller 2 via the first radio control unit 108 (Step S6). The camera 1B then changes to the sleep mode (e.g., the sniff mode in the Bluetooth system) (Step S7). During the sleep mode, the camera 1B can only receive requests from the controller 2 or the other cameras 1.

The central control unit 201 of the controller 2 then transmits an automatic transfer start request to the camera 1A via the radio control unit 207 (Step S8). This automatic transfer start request includes a request to transmit a wake-up request to the controller 2 after completion of the automatic transfer processing. The wake-up request indicates a request to exit the sleep mode, i.e., to change to a normal mode. Upon reception of the automatic transfer start request, the central control unit 101 of the camera 1A transmits an acknowledgement of the automatic transfer start request to the controller 2 via the first radio control unit 108 (Step S9). When receiving the acknowledgement of the automatic transfer start request, the controller 2 changes to the sleep mode (e.g., the sniff mode in the Bluetooth system) (Step S10). The camera 1A then executes the automatic transfer processing (Step S11).

The automatic transfer processing will now be explained in detail. In the automatic transfer processing, the central control unit 101 of the camera 1A firstly requests the smartphone SP to establish a Wi-Fi connection via communication in the BLE standard. After the establishment of the Wi-Fi connection, the central control unit 101 of the camera 1A transfers image data recorded in the recording medium 106A to the smartphone SP over the Wi-Fi link, and then disconnects the Wi-Fi connection while maintaining the BLE connection.

Upon completion of the automatic transfer processing by the camera 1A (Step S12), the central control unit 101 of the camera 1A transmits a wake-up request to the controller 2 via the first radio control unit 108 (Step S13).

When receiving the wake-up request, the controller 2 changes to the normal mode. The central control unit 201 of the controller 2 then transmits an automatic transfer completion confirmation request (a request for confirming completion of automatic transfer) to the camera 1A via the radio control unit 207 (Step S14). The automatic transfer completion confirmation request includes a request (sleep request) to change to the sleep mode. Upon reception of the automatic transfer completion confirmation request, the central control unit 101 of the camera 1A transmits an acknowledgement of the automatic transfer completion confirmation request to the controller 2 via the first radio control unit 108 (Step S15). The camera 1A then changes to the sleep mode (e.g., the sniff mode in the Bluetooth system) (Step S16).

At this stage where the controller 2 receives the acknowledgement of the automatic transfer automatic transfer completion confirmation request from the camera 1A, the controller 2 has not yet received the acknowledgement of the automatic transfer completion confirmation request from all the cameras including the camera 1B. The central control unit 201 of the controller 2 accordingly transmits a wake-up request to the camera 1B that has not yet transmitted the acknowledgement of the automatic transfer completion confirmation request, via the radio control unit 207 (Step S17). When receiving the wake-up request, the camera 1B changes to the normal mode. The central control unit 101 of the camera 1B then transmits an acknowledgement of the wake-up request to the controller 2 via the first radio control unit 108 (Step S18).

The central control unit 201 of the controller 2 then transmits an automatic transfer start request to the camera 1B via the radio control unit 207 (Step S19). This automatic transfer start request also includes a request to transmit a wake-up request to the controller 2 after completion of the automatic transfer processing, as in Step S8. Upon reception of the automatic transfer start request, the central control unit 101 of the camera 1B transmits an acknowledgement of the automatic transfer start request to the controller 2 via the first radio control unit 108 (Step S20). When receiving the acknowledgement of the automatic transfer start request, the controller 2 changes to the sleep mode (Step S21). The camera 1B then executes the automatic transfer processing (Step S22). The automatic transfer processing in Step S22 is identical to that in Step S11 and will not be redundantly explained.

Upon completion of the automatic transfer processing by the camera 1B (Step S23), the central control unit 101 of the camera 1B transmits a wake-up request to the controller 2 via the first radio control unit 108 (Step S24).

When receiving the wake-up request, the controller 2 changes to the normal mode. The central control unit 201 of the controller 2 then transmits an automatic transfer completion confirmation request to the camera 1B via the radio control unit 207 (Step S25). This automatic transfer completion confirmation request also includes a request (sleep request) to change to the sleep mode, as in Step S14. Upon reception of the automatic transfer completion confirmation request, the central control unit 101 of the camera 1B transmits an acknowledgement of the automatic transfer completion confirmation request to the controller 2 via the first radio control unit 108 (Step S26). The camera 1B then changes to the sleep mode (Step S27).

When receiving the acknowledgement of the automatic transfer completion confirmation requests from all the cameras (1A and 1B), the controller 2 changes to the sleep mode (Step S28). The multiple-connection camera system 100 then terminates the automatic image transfer processing.

As described above, the multiple-connection camera system 100 according to the embodiment includes the controller 2 and the plural cameras 1. The controller 2 requests the plural cameras 1 to execute predetermined common processing (automatic transfer processing), and requests the plural cameras 1 to change to the energy saving mode (sleep mode) or the normal mode. The controller 2 controls the cameras 1 such that one of the cameras 1 executes the predetermined processing while the rest of the cameras 1 is in the energy saving mode, and such that all the cameras 1 execute the predetermined processing in sequence. The individual cameras 1 execute the predetermined processing (automatic transfer processing) in response to the execution request to execute the predetermined processing from the controller 2. In response to completion of the predetermined processing, the cameras 1 transmit a request to change to the normal mode to the controller 2 that has been in the energy saving mode after transmitting the execution request of the predetermined processing.

In the multiple-connection camera system 100 according to the embodiment, all the cameras 1 execute the predetermined processing (automatic transfer processing) in sequence. This control can prevent the cameras 1 from executing the predetermined processing at the same time. In addition, one of the cameras 1 executes the predetermined processing while the rest of the cameras 1 is in the energy saving mode. This control can reduce the waste of electric power.

The multiple-connection camera system 100 according to the embodiment can thus allow the cameras 1 to efficiently execute the predetermined common processing (automatic transfer processing) with low power consumption.

The controller 2 in the multiple-connection camera system 100 according to the embodiment can change to the energy saving mode (sleep mode) or the normal mode. In response to the change of the controller 2 to the energy saving mode, the controller 2 starts the control to instruct one of the cameras 1 to execute the predetermined processing (automatic transfer processing) and the rest of the cameras 1 to change to the energy saving mode.

That is, one of the cameras 1 executes the predetermined processing while the rest of the cameras 1 and the controller 2 are in the energy saving mode in the multiple-connection camera system 100 according to the embodiment. This control can further reduce the waste of electric power.

The controller 2 in the multiple-connection camera system 100 according to the embodiment changes to the energy saving mode in response to the start of the predetermined processing (automatic transfer processing) by one of the cameras 1 and the change of the rest of the cameras 1 to the energy saving mode.

That is, the controller 2 is in the energy saving mode during the predetermined common processing (automatic transfer processing) of the plural cameras 1 in the multiple-connection camera system 100 according to the embodiment. This control can further reduce the waste of electric power.

In response to a wake-up request from one of the cameras 1 upon completion of the predetermined processing (automatic transfer processing), the controller 2 in the multiple-connection camera system 100 according to the embodiment exits the energy saving mode (sleep mode), i.e., changes to the normal mode, and instructs one of the rest of the cameras 1 to change to the normal mode and execute the predetermined processing.

The multiple-connection camera system 100 according to the embodiment can thus effectively reduce the electric power consumption without impairing the efficiency of the predetermined common processing (automatic transfer processing) at the plural cameras 1.

The multiple-connection camera system 100 according to the embodiment causes each of the cameras 1 to execute the predetermined common processing (automatic transfer processing) of transferring images captured at the imaging unit 103 in the camera 1 to an external device/apparatus (smartphone SP). In detail, each of the cameras 1 transfers images captured at the imaging unit 103 in the camera 1 to the external device/apparatus in response to a request (shooting request) from the controller 2.

This control can prevent the cameras 1 from transferring images at the same time.

The camera 1 in the multiple-connection camera system 100 according to the embodiment changes to the energy saving mode upon reception of a completion confirmation request (automatic transfer completion confirmation request) of the predetermined processing (automatic transfer processing) from the controller 2 that has exited the energy saving mode (sleep mode), i.e., has changed to the normal mode. This control can prevent the camera 1 from changing to the energy saving mode before completing the predetermined processing (automatic transfer processing).

The above-described embodiments should not be construed to limit the invention and may be subjected to various improvements and design variations within the gist of the invention.

For example, although the process executing apparatuses are two cameras 1A and 1B in the embodiments described above, three or more cameras 1 may be provided.

Although the external device/apparatus is a smartphone SP in the embodiments described above, the external device/apparatus may also be a tablet personal computer (PC), a cellphone, a personal digital assistant (PDA), a laptop PC, or a cloud server, for example. Although the individual cameras 1 are capable of radio communication utilizing synchronous communication scheme in the BLE and Wi-Fi standards with the smartphone SP in the embodiments, the cameras 1 may have any other communication scheme.

Although the cameras 1 execute the predetermined common processing or the automatic transfer processing of transferring images captured at the imaging unit 103 in the camera 1 to the external device/apparatus (smartphone SP) in the embodiments described above, the cameras 1 may execute any other common processing. For example, one of the cameras 1 may exclusively perform sequential imaging operations in response to requests (shooting requests) from the controller 2, while the rest of the cameras 1 are performing interval imaging operations. This control can achieve compatibility between efficiency and electric energy saving in the control of the plural cameras 1 that capture images in mutually different directions.

Although the controller 2 is in the sleep mode during the automatic transfer processing at the cameras 1 (steps S10 and S21 in FIG. 4) in the embodiments described above, the controller 2 does not necessarily change to the sleep mode during the automatic transfer processing. This modification can eliminate the exiting operation of the controller 2 from the sleep mode, i.e. the changing operation to the normal mode, leading to rapid control of the predetermined common processing (automatic transfer processing) at the cameras 1.

The above-described embodiments of the invention should not be construed to limit the scope of the invention. The scope of the invention is defined by the following claims and equivalents thereof.

What is claimed is:

1. A control apparatus to control a plurality of process executing apparatuses, the control apparatus comprising:
   a processor which transmits, to each of the process executing apparatuses, a first signal which instructs the process executing apparatuses to execute predetermined processing common to the process executing apparatuses, a second signal which instructs the process executing apparatuses to change to an energy saving mode, and a third signal which instructs the process executing apparatuses to change to a normal mode,
   wherein the processor performs control of transmission of the first signal, the second signal, and the third signal to each of the process executing apparatus such that:
   (i) the processor transmits the first signal to a first process executing apparatus among the plurality of process executing apparatuses to instruct the first process executing apparatus to execute the predetermined processing, and transmits the second signal to all process executing apparatuses among the plurality of process executing apparatuses other than the first process executing apparatus, such that all of the process executing apparatuses other than the first process executing apparatus are in the energy saving mode while the first process executing apparatus executes the predetermined processing, and
   (ii) after the first process executing apparatus completes execution of the predetermined processing, the processor transmits the second signal to the first process executing apparatus to instruct the first process executing apparatus to change to the energy saving mode, and transmits the third signal and the first signal to a second process executing apparatus which is among the process executing apparatuses and which is in the energy saving mode, to instruct the second process executing apparatus to change to the normal mode and to execute the predetermined processing, such that all of the process executing apparatuses other than the second process executing apparatus are in the energy saving mode while the second process executing apparatus executes the predetermined processing,
   whereby the processor performs control of the transmission of the first signal, the second signal, and the third signal such that one of the process executing apparatuses executes the predetermined processing while a remainder of the process executing apparatuses, other than the process executing apparatus which is executing the predetermined processing, are in the energy saving mode, and such that all of the process executing apparatuses execute the predetermined processing in sequence.

2. The control apparatus according to claim 1, wherein:
   the processor controls the control apparatus itself to change to an energy saving mode or a normal mode, and
   in response to an instruction to change the control apparatus to the energy saving mode, the processor starts the control to transmit the first signal to one of the process executing apparatuses to instruct said one of the process executing apparatuses to execute the predetermined processing, and to transmit the second signal to a remainder of the process executing apparatuses, other than the process executing apparatus which is executing the predetermined processing, to instruct the remainder of the process executing apparatuses to change to the energy saving mode.

3. The control apparatus according to claim 2, wherein the processor controls the control apparatus to change to the energy saving mode in response to a start of execution of the predetermined processing by one of the process executing apparatuses and a change of a remainder of the process executing apparatuses, other than the process executing apparatus which is executing the predetermined processing, and which are not already in the energy saving mode, to the energy saving mode.

4. The control apparatus according to claim 3, wherein:
   the processor receives a signal transmitted from said one of the process executing apparatuses upon completion of the predetermined processing by said one of the process executing apparatuses, and
   in response to the received signal, the processor controls the control apparatus to change from the energy saving mode to the normal mode, and performs the control to transmit the third signal and the first signal to another one of the process executing apparatuses which is in the energy saving mode to instruct said another one of the process executing apparatuses to change to the normal mode and execute the predetermined processing.

5. The control apparatus according to claim 1, wherein in response to completion of the predetermined processing by one of the process executing apparatuses, the processor performs the control to transmit the third signal and the first signal to another one of the process executing apparatuses which is in the energy saving mode to instruct said another one of the process executing apparatuses to change to the normal mode and execute the predetermined processing.

6. The control apparatus according to claim 1, wherein the predetermined processing comprises transferring an image captured by an imaging unit included in each of the process executing apparatuses to an external device.

7. The control apparatus according to claim 6, wherein
   the processor further transmits, to each of the process executing apparatuses, a fourth signal which instructs the process executing apparatuses to capture an image, and
   the predetermined processing comprises transferring the image captured by each of the process executing apparatuses to the external device in response to the fourth signal instructing capturing of the image.

8. A control method executed in a control apparatus which controls a plurality of process executing apparatuses, the method comprising:

transmitting, to each of the process executing apparatuses, a first signal which instructs the process executing apparatuses to execute predetermined processing common to the process executing apparatuses;

transmitting, to each of the process executing apparatuses, a second signal which instructs the process executing apparatuses to change to an energy saving mode;

transmitting, to each of the process executing apparatuses, a third signal which instructs the process executing apparatuses to change to a normal mode; and performing control processing to control transmission of the first signal, the second signal, and the third signal to each of the process executing apparatuses such that:

(i) the first signal is transmitted to a first process executing apparatus among the plurality of process executing apparatuses to instruct the first process executing apparatus to execute the predetermined processing, and the second signal is transmitted to all process executing apparatuses among the plurality of process executing apparatuses other than the first process executing apparatus, such that all of the process executing apparatuses other than the first process executing apparatus are in the energy saving mode while the first process executing apparatus executes the predetermined processing, and (ii) after the first process executing apparatus completes execution of the predetermined processing, the second signal is transmitted to the first process executing apparatus to instruct the first process executing apparatus to change to the energy saving mode, and the third signal and the first signal are transmitted to a second process executing apparatus which is among the process executing apparatuses and which is in the energy saving mode, to instruct the second process executing apparatus to change to the normal mode and to execute the predetermined processing, such that all of the process executing apparatuses other than the second process executing apparatus are in the energy saving mode while the second process executing apparatus executes the predetermined processing, whereby the control processing is performed such that one of the process executing apparatuses executes the predetermined processing while a remainder of the process executing apparatuses, other than the process executing apparatus which is executing the predetermined processing, are in the energy saving mode and such that all of the process executing apparatuses execute the predetermined processing in sequence.

9. The control method according to claim 8, further comprising:

controlling the control apparatus itself to change to an energy saving mode or a normal mode, wherein:

in response to an instruction to change the control apparatus to the energy saving mode the control processing is performed such that (i) the first signal is transmitted to one of the process executing apparatuses to instruct said one of the process executing apparatuses to execute the predetermined processing and the second signal is transmitted to a remainder of the process executing apparatuses, other than the process executing apparatus which is executing the predetermined processing, to instruct the remainder of the process executing apparatuses to change to the energy saving mode.

10. The control method according to claim 9, wherein the control apparatus is changed to the energy saving mode, in response to a start of the predetermined processing by one of the process executing apparatuses and a change of a remainder of the process executing apparatuses, other than the process executing apparatus which is executing the predetermined processing, and which are not already in the energy saving mode, to the energy saving mode.

11. The control method according to claim 10, wherein in response to receipt of a signal output from said one of the process executing apparatuses upon completion of the predetermined processing by said one of the process executing apparatuses, (i) the control apparatus is changed from the energy saving mode to the normal mode, and (ii) the control processing is performed such that the third signal and the first signal are transmitted to another one of the process executing apparatuses which is in the energy saving mode to instruct said another one of the process executing apparatuses to change to the normal mode and execute the predetermined processing.

12. The control method according to claim 8, wherein, in response to completion of the predetermined processing by one of the process executing apparatuses, the control processing is performed such that the third signal and the first signal are transmitted to another one of the process executing apparatuses which is in the energy saving mode to instruct said another one of the process executing apparatuses to change to the normal mode and execute the predetermined processing.

13. The control method according to claim 8, wherein the predetermined processing comprises transferring an image captured by an imaging member included in each of the process executing apparatuses to an external device.

14. The control method according to claim 13, further comprising:

transmitting, to each of the process executing apparatuses, a fourth signal which instructs each of the process executing apparatuses to capture an image, wherein the predetermined processing comprises transferring the image captured by each of the process executing apparatuses to the external device in response to the fourth signal.

15. A control system to control a plurality of process executing apparatuses with a control apparatus, the system comprising:

the control apparatus; and the process executing apparatuses, wherein:

the control apparatus includes:

a first processor which transmits, to each of the process executing apparatuses, a first signal which instructs the process executing apparatuses to execute predetermined processing common to the process executing apparatuses, a second signal which instructs the process executing apparatuses to change to an energy saving mode, and a third signal which instructs the process executing apparatuses to change to a normal mode, wherein the first processor performs control of transmission of the first signal, the second signal, and the third signal to each of the process executing apparatuses such that:

(i) the first processor transmits the first signal to a first process executing apparatus among the plurality of process executing apparatuses to instruct the first process executing apparatus to execute the predetermined processing, and transmits the second signal to all process executing apparatuses among the plurality of process executing apparatuses other than the first process executing apparatus, such that all of the process executing apparatuses other than the first process executing apparatus are in the energy saving mode while the first process executing apparatus executes the predetermined processing, and (ii) after the first process executing apparatus completes execution of the predetermined processing, the first processor transmits the second signal to the first process executing apparatus to instruct the first process executing apparatus to change to the energy saving mode, and transmits the third signal and the first signal to a second process executing apparatus which is among the process executing apparatuses and which is in the energy saving mode, to instruct the second process executing apparatus to change to the normal mode and to execute the predetermined processing, such that all of the process executing apparatuses other than the second process executing apparatus are in the energy saving mode while the second process executing apparatus executes the predetermined processing, whereby the first processor performs control of the transmission of the first signal, the second signal, and third signal such that one of the process executing apparatuses executes the predetermined processing while a remainder of the process executing apparatuses, other than the process executing apparatus which is executing the predetermined processing, are in the energy saving mode, and such that all of the process executing apparatuses execute the predetermined processing in sequence, wherein the first processor controls the control apparatus to change from a normal mode to an energy saving mode after transmitting the first signal; and each of the process executing apparatuses includes:

a second processor which executes the predetermined processing in response to reception, from the control apparatus, of the first signal, wherein, in response to completion of the predetermined processing, the second processor transmits, to the control apparatus, a fourth signal which instructs the control apparatus to change from the energy saving mode to which the control apparatus had changed after having transmitted the first signal, to the normal mode.

16. A control system to control a plurality of process executing apparatuses with a control apparatus, the system comprising:

the control apparatus; and the process executing apparatuses, each of the plurality of process executing apparatuses comprising a processor, wherein:

the control apparatus transmits, to the processor of each of the plurality of process executing apparatuses, a first signal which instructs the processor to execute predetermined processing, a second signal which instructs the processor to change from a normal mode to an energy saving mode, and a third signal which instructs the processor to change from the energy saving mode to the normal mode;

the control apparatus performs control of transmission of the first signal and the second signal such that the first signal is transmitted to a first process executing apparatus among the plurality of process executing apparatuses, and such that the second signal is transmitted to a remainder of the process executing apparatuses other than the first process executing apparatus;

after transmission of the first signal and the second signal and during execution of the predetermined processing by the first process executing apparatus, the control apparatus changes to an energy saving mode;

in response to reception of the first signal from the control apparatus, the processor of the first process executing apparatus executes the predetermined processing;

in response to reception of the second signal from the control apparatus, the processor of a remainder of the process executing apparatuses other than the first process executing apparatus controls the remainder of the process executing apparatuses other than the first process executing apparatus to change to the energy saving mode, respectively;

in response to the completion of the predetermined processing, the processor of the first process executing apparatus transmits, to the control apparatus, a fourth signal which instructs the control apparatus to change from the energy saving mode to a normal mode;

in response to reception of the fourth signal from the processor of the first process executing apparatus, the control apparatus changes to the normal mode;

the control apparatus having changed to the normal mode performs control of transmission of the first signal, the second signal, and the third signal, such that the second signal is transmitted to the processor of the first process executing apparatus, and such that the third signal and the first signal are transmitted to a second process executing apparatus which is among the plurality of process executing apparatuses and which is in the energy saving mode;

in response to reception of the third signal and first signal from the control apparatus, the processor of the second process executing apparatus executes the predetermined processing and controls the second process executing apparatus to change from the energy saving mode to the normal mode; and in response to reception of the second signal from the control apparatus, the processor of the first process executing apparatus controls the first process executing apparatus to change to the energy saving mode, whereby a remainder of the process executing apparatuses other than the second process executing apparatus are in the energy saving mode.

17. A control method executed in a control system comprising a control apparatus and a plurality of process executing apparatuses controlled by the control apparatus, each of the plurality of process executing apparatuses comprising a processor, the method comprising:

transmitting, by the control apparatus, to the processor of each of the plurality of process executing apparatuses, a first signal which instructs the processor to execute predetermined processing, a second signal which instructs the processor to change from a normal mode to an energy saving mode, and a third signal which instructs the processor to change from the energy saving mode to the normal mode;

performing, by the control apparatus, control of transmission of the first signal and the second signal such that the first signal is transmitted to a first process executing apparatus among the plurality of process executing apparatuses, and such that the second signal is transmitted to a remainder of the process executing apparatuses other than the first process executing apparatus;

after transmission of the first signal and the second signal and during execution of the predetermined processing by the first process executing apparatus, changing the control apparatus to an energy saving mode;

in response to reception of the first signal from the control apparatus, executing, by the processor of the first process executing apparatus, the predetermined processing;

in response to reception of the second signal from the control apparatus, controlling, by the processor of a remainder of the process executing apparatuses other than the first process executing apparatus, the remainder of the process executing apparatuses other than the first process executing apparatus to change to the energy saving mode, respectively;

in response to the completion of the predetermined processing, transmitting, by the processor of the first process executing apparatus, to the control apparatus, a fourth signal which instructs the control apparatus to change from the energy saving mode to a normal mode;

in response to reception of the fourth signal from the processor of the first process executing apparatus, changing the control apparatus to the normal mode;

performing, by the control apparatus having changed to the normal mode, control of transmission of the first signal, the second signal, and the third signal, such that the second signal is transmitted to the processor of the first process executing apparatus, and such that the third signal and the first signal are transmitted to a second process executing apparatus which is among the plurality of process executing apparatuses and which is in the energy saving mode;

in response to reception of the third signal and first signal from the control apparatus, executing, by the processor of the second process executing apparatus the predetermined processing, and controlling, by the processor of the second process executing apparatus, the second process executing apparatus to change from the energy saving mode to the normal mode; and in response to reception of the second signal from the control apparatus, controlling, by the processor of the first process executing apparatus, the first process executing apparatus to change to the energy saving mode, whereby a remainder of the process executing apparatuses other than the second process executing apparatus are in the energy saving mode.

* * * * *